Aug. 30, 1966
J. E. OESCHGER
3,270,259
VACUUM VARIABLE CAPACITOR
Filed Feb. 3, 1965
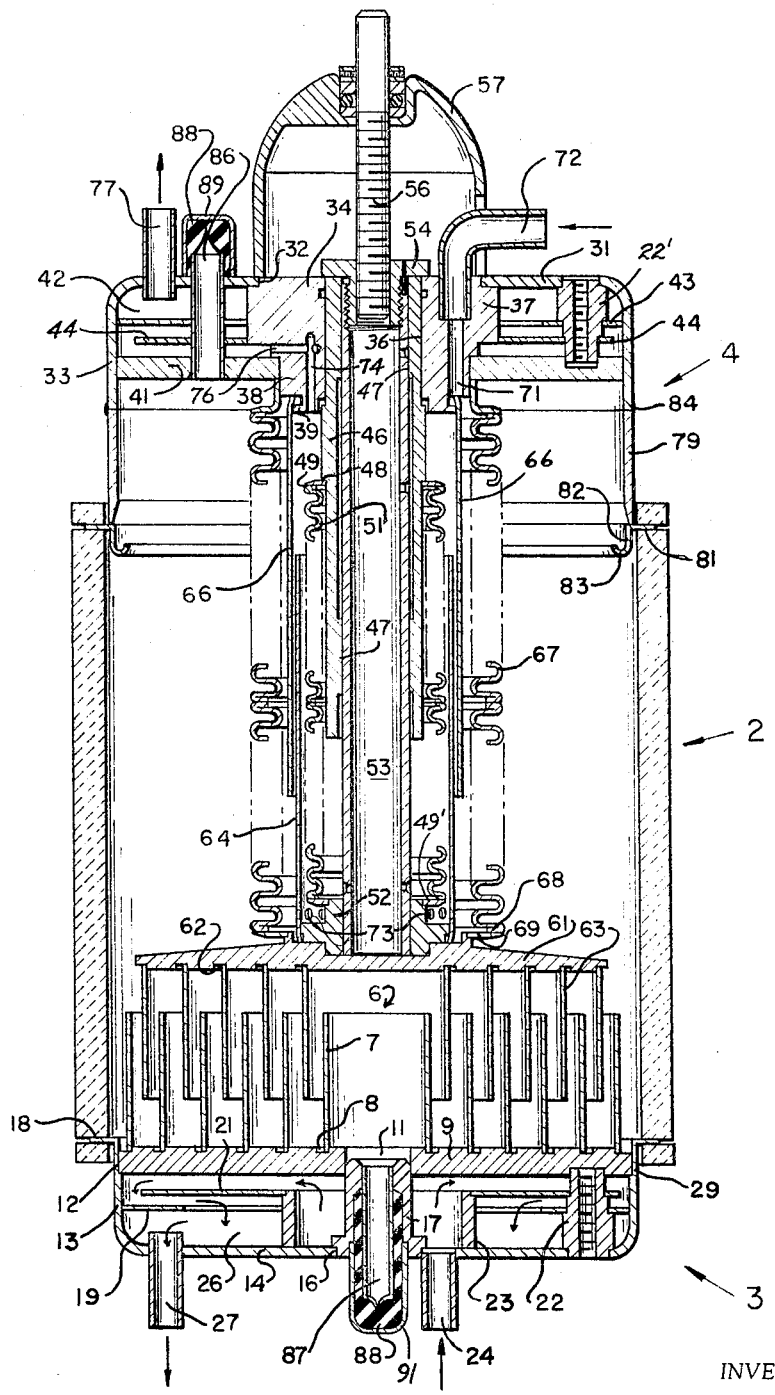
INVENTOR.
JOSEPH E. OESCHGER
BY
John J. Leavitt United States Patent Office 3,270,259
Patented August 30, 1966

3,270,259
VACUUM VARIABLE CAPACITOR
Joseph E. Oeschger, Palo Alto, Calif., assignor to Jennings Radio Manufacturing Corporation, San Jose, Calif., a corporation of Delaware
Filed Feb. 3, 1965, Ser. No. 430,002
13 Claims. (Cl. 317—243)

This application relates to vacuum variable capacitors, and particularly to a vacuum variable capacitor incorporating means for cooling the heat generated in the electrodes thereof.

Conventional vacuum variable capacitors utilize a plurality of very closely spaced concentric "cans" suitably attached to a support plate, which is often an end plate of the envelope, as one of the electrodes of the capacitor, with the other or mobile electrode being comprised of a complementary set of cylindrical "cans" mounted on the inner end of a stem structure slidably disposed on the opposite end plate of the envelope. Because of the spacing between the concentric "cans" in these capacitors, and the high voltage and current normally attainable, considerable heat is generated in the units when operated at full capacity. The capacity of these units, on the other hand, may be increased substantially by water cooling the end plates or electrodes. The capacitor illustrated and decribed hereinafter for instance is designed to withstand 100+k.v.p. at 60 cycles and carry more than 1000 amperes (R.M.S.) at frequencies of 20 mc. and greater. This is more than four times as much current as an uncooled unit of similar construction is capable of carrying.

It is accordingly one of the objects of the present invention to provide a vacuum variable capacitor which incorporates fluid cooling means.

One of the difficulties with conventional type vacuum variable capacitors that are subject to variation in temperature is that such variations in temperature result in variations in the capacitive characteristics of the unit. In other words, the units are temperature sensitive. Accordingly, it is another object of this invention to provide a vacuum variable capacitor which is substantially less temperature sensitive than conventional units.

Another problem that is often encountered with conventional type vacuum variable capacitors is variation in the amount of torque required to move the movable electrode through a given excursion. One of the reasons for this torque variation is that the mechanism which provides inward and outward movement of the mobile capacitor plates also carries current, and is therefore subject to increases and decreases in temperature. These variations in temperature result in thermal expansion and contraction of the parts, which in turn results in variation in the amount of torque required to move the parts relative to each other. It is therefore another object of this invention to provide a vacuum variable capacitor in which the thermal expansion and contraction of the parts is minimal so that the torque between minimum and maximum capacitance of the unit is substantially constant.

Conventional vacuum variable capacitors have also been noted for their high weight, more of the weight being concentrated in the end plate assemblies. It is therefore one of the objects of this invention to provide an end plate or cap assembly for a vacuum variable capacitor that is not only easy to fabricate, light in weight, and possessed of the requisite rigidity, but also incorporates means for providing a tortuous path through which a coolant fluid may be circulated.

The invention possesses other objects and features of advantage, some of which, with the foregoing, will be apparent from the following description and the drawing. It is to be understood however that the invention is not limited to the embodiment illustrated and described but may be embodied in different forms within the scope of the appended claims.

Referring to the drawing:

The figure is a vertical half sectional view taken through the longitudinal axis of the vacuum variable capacitor of the invention.

Broadly considered, the vacuum variable capacitor of the invention comprises an elongated generally cylindrical dielectric and metallic envelope closed at each opposite end by metallic end cap assemblies. One of the end cap assemblies constitutes the mounting for the fixed electrode, while the opposite end cap assembly constitutes the mounting for the mobile electrode. The fixed electrode end cap assembly comprises a hollow manifold type construction having a tortuous path therethrough for the passage of a coolant fluid. The opposite or mobile end cap assembly includes substantially the same type of manifold construction, including the tortuous passageway therethrough, and in addition incorporates annular passageways defined by expansible and contractible metallic bellows assemblies and their metallic sleeves which permit relative movement of the electrodes within the evacuated envelope. In the present construction the electrodes comprise a multiplicity of concentric "cans" arranged to interleave one with the other upon inward and outward movement of the mobile electrode. Means are provided within the evacuated envelope or bellows assembly to channel the coolant fluid in a direction such that all of the bellows surface is subjected to the cooling effect of the coolant fluid. Additionally, means are provided within the envelope providing protection against corona discharge within the envelope structure and the imposition of excess electrical stress on the seals as a result of a voltage gradient.

In terms of greater detail, the vacuum variable capacitor of the invention comprises an evacuated envelope including a tubular die-electric portion 2, preferably ceramic, closed at one end of a fixed end cap assembly designated generally by the numeral 3, and closed at its other end by a mobile end cap assembly designated generally by the numeral 4.

The fixed end cap assembly 3 constitutes the supporting structure for the fixed electrode assembly 6, which is comprised of a multiplicity of concentric cylindrical capacitor plates 7, each brazed at one end within an annular groove or channel 8 formed in an annular support plate 9 having a central aperture 11, and about its outer peripheral edge 12 being hermetically brazed to the flange or side wall portion 13 of a cup-shaped end plate 14 which is also provided with a central aperture 16. Communicating between aperture 11 in plate 9 and aperture 16 in plate 14 is a tubular plug 17 having outer peripheral portions brazed within the apertures in a manner to join plates 9 and 14 in a rigid fluid and vacuum-tight manner. At its end remote from plate 14, the cylindrical flange 13 is provided with a radially outwardly extending peripheral or seal flange 18 hermetically bonded to the metallized end edge of the dielectric portion 2.

Plate 14 is axially spaced from plate 9, and the annular space therebetween is divided into a tortuous passageway by radially extending baffles 19 and 21, the baffle 19 being supported adjacent its outer periphery on cylindrical sleeve 23 brazed to plate 14 about plug 17. The outer periphery of baffle 21 is spaced a short distance from cylindrical flange 13, while the inner periphery of baffle 19 is radially spaced a short distance from cylindrical sleeve 23. An inlet port or passageway 24 is provided communicating with the interior of sleeve 23 within the end cap assembly and functions to admit a coolant fluid thereinto which uniformly traverses the tortuous passageway formed between support plate 9, baffle 21, baffle 19, and plate 14. A port 27 provides for egress of coolant fluid from the end cap assembly.

It will thus be seen that coolant fluid admitted through port 24 passes first through the interior of sleeve 23 and spreads uniformly radially outwardly over the top surface of baffle 21. It then spills over the outer peripheral edge of baffle 21 onto baffle 19 and flows inwardly toward the central aperture in this baffle and into the space between baffle 19 and plate 14. As it passes over the surfaces it absorbs heat from the support plate 9. It should be noted that the coolest coolant fluid comes in contact with the hottest portion of the assembly first, i.e., the support plate 9, thus providing for greater efficiency of heat transfer.

One of the problems often encountered in vacuum variable capacitors which utilize a combination of dielectric material bonded to a metal is that the differences in the coefficients of thermal expansion and contraction of the dissimilar materials imposes severe and often destructive stresses on the seals. Unless some means of protecting these seals is provided, such as providing a flexible union, raising the parts to an elevated bonding temperature will result in thermal shock being imposed on the ceramic, with the attendant danger that the dielectric, and therefore the envelope, will be ruptured.

In the present construction, the fixed end cap assembly flange 13 is provided with a thinned portion 29, immediately adjacent the radially outwardly extending flange 18 and extending axially therefrom and to which thinned portion the outer peripheral edge 12 of the support plate 9 is brazed. It should be noted that the the surface 12 of plate 9 is brazed to the thinned-down portion of flange 13 at a point axially spaced from the radially extending flange 18. The reason for this is that if a heavy cross section of metal such as plate 9 is placed in the same general plane as the flange 18 which is brazed to the metallized end edge of the dielectric 2, differences in thermal expansion and contraction between the dissimilar materials impose an extremely severe stress on the seal, often causing its rupture. With the heavy cross section of metal spaced axially away from the flange 18, or out of its general plane, there remains a sufficient length of thinned-down portion 29 to flexibly accommodate such differences in thermal expansion and contraction between the metal and dielectric parts.

At the other end of the capacitor, the mobile end cap assembly 4 comprises an end plate or bottom 31, having a central aperture 32, and a peripheral cylindrical flange or side wall portion 33. A central metallic bearing support member 34 is brazed within the central aperture of end plate or bottom 31. The bearing support member 34 is provided at its inner end with a radially extending flange 39 for purposes which will hereinafter be explained. Interposed between the cylindrical flange 33 of plate 31 and the stem portion 38 of the member 34 is a transversely extending plate 41. The plate 41 cooperates with flange 33 and plate 31 and bearing support member 34 to stiffen the end cap assembly and to provide a chamber 42 within the mobile end cap assembly 4 for the passage of coolant fluid. The chamber 42 is divided into a plurality of interconnected passageways formed by the plate 31 on the one hand, a transversely extending baffle plate 43 axially spaced from the plate 31 and brazed to mounting lugs 22' similar to lugs 22 on the fixed end cap assembly around its outer periphery to the flange 33, and a second baffle plate 44 brazed at its inner periphery about the flange portion 37 of support member 34, and spaced at its outer periphery from the inner surface of flange 33. The baffle 43 is annular in configuration with its inner periphery concentrically spaced about the outer periphery of the flange portion 37 of the bearing support member 34.

Brazed within the central bore 36 of the bearing support member 34 is an elongated slide bearing 46, its inner and outer ends being provided with a bearing pad 47. The outer surface of the slide bearing is provided with a shoulder 48 on which a heliarc ring 49 is brazed. The outer end of a bellows 51 is heliarc welded in a fluid-tight manner to the outer periphery of the heliarc ring.

The inner end of bellows 51 is heliarc welded in a fluid-tight manner to a heliarc ring 49' fixed on the outer periphery of a mounting head 52 of annular configuration. The inner periphery of the mounting head is brazed about the inner end of an elongated slide stem 53, the outer end of which is slidably disposed within the slide bearing 46. The outer end of the slide stem 53 is provided with a threaded section engaged by a threaded bushing member 54. The bushing member 54 is internally threaded to receive an actuating stem 56, the outer end of which is threadedly disposed within a thrust bearing shell 57 as shown. It will thus be apparent that rotation of the actuator stem 56 imposes a thrust against the member 57, with the result that the slide shaft 53 is withdrawn from the envelope against the pressure of the atmosphere working on the interior of bellows 51 and against the pressure of the coolant fluid working against other portions of the actuating assembly.

Brazed across the mounting head 52 is a mobile base or support plate 61, the surface thereof remote from the mounting head 52 being provided with a plurality of annular and concentric grooves 62 within which are brazed the mobile capacitor plates 63 as shown. The spacing of capacitor plates 63 is such as permit them to interleave with the capacitor plates 7 of the fixed electrode.

To extract heat from the mobile support plate 61, means are provided connecting the coolant chamber 42 with coolant passageways formed about the bellows 51. Thus, fixedly secured about the outer periphery of the mounting head 52, as by crimping, is a tubular shell-like member 64, the other end of which extends into the interior of a second tubular shell-like member 66 extending in the opposite direction and having its opposite end fixedly secured to the flange 39 on bearing support member 34. While these shells have been shown slightly spaced apart for clarity, it is intended that they fit in a close fluid-tight sliding arrangement. The tubular shells 64 and 66 are axially slidable relative to one another, to permit expansion and contraction of the bellows 51, and function as tubular baffles to channel the flow of coolant fluid to the inner end of the bellows assembly and around the bearing assembly. In this regard, the outer end of a second bellows 67 is heliarc welded to the outer peripheral edge of a heliarc ring 68 brazed about the stem portion 38 of the bearing support member 34. The inner end of the bellows is heliarc welded to an appropriate flange 69 brazed to plate 61 as shown. The bellows 67 concentrically surrounds the tubular baffles 64 and 66. It should be noted that both bellows 51 and 67 are each comprised of two separate units that are axially aligned and united as by heliarc welding. This method of fabrication provides longer bellows life by spreading the stresses and strains of bellows flexure over a longer length. Additionally, it has been found that uniting the bellows to associated structure by heliarc welding instead of brazing increases the bellows life by about seventy-five percent.

To channel coolant fluid through the space which remains between the bellows 67 and baffles 64 and 66, the bearing support member 34 is provided with an inlet passageway 71, connected at its lower end to the space between the baffle 66 and bellows 67, and connected at its outer end with an appropriate conduit 72 adapted to be connected to a source of coolant fluid. Such coolant fluid flows into the system through the passageway 71, fills the space between baffles 64–66 and bellows 67, and passes through apertures 73 formed in baffle 64 adjacent the mounting head 52 so as to be admitted into the space between the bellows 51 and baffle 64–66. From this space the coolant fluid passes upwardly through a plurality of passageways 74 formed in bearing support member 34, the passageways 74 communicating with a corresponding number of radially extending passageways 76 which connect with chamber 42.

As coolant fluid flows from passageways 76 into the chamber 42, it is channeled by the baffle plate 44 radially outwardly where it flows upwardly through the space provided between the flange 33 and the outer periphery of plate 44, from whence it passes into the passageway between baffle plates 43 and 44. As it reaches the inner periphery of baffle plate 43 the coolant fluid flows through the annular space between the baffle plate 43 and the centrally disposed bearing member 34 and fills the chamber thereabout. From this chamber the coolant fluid flows out of the system through outlet port 77. It will thus be seen that both the fixed end plate assembly and the mobile end plate assembly, including the support plate 61 forming a part of the latter, are directly cooled by the coolant fluid.

The mobile end cap assembly is preferably fabricated as a subassembly, with the end of flange 33 remote from plate 31 being left free for final attachment by abutment to a cylindrical member 79 constituting an extension thereof, the other end of which is brazed to a seal ring 81, having a cylindrical corona ring portion 82 extending into the dielectric envelope portion and being provided with an in-turned or rolled-over end section 83 to shield the adjacent seal area against the effects of a destructive potential gradient within the seal area. This construction insures substantial flexibility in the union between the dielectric and metal parts, while at the same time insuring that undesirable corona emission does not occur within the envelope. The abutted ends of flange 33 and cylindrical member 79 are heliarc welded in a final seal as at 84.

After final seal, the envelope is evacuated through convenient tubulations 86 on the mobile end cap assembly and 87 on the fixed end cap assembly. The pinched-off end of the tubulation in each case is protected by appropriate resilient potting material 88 such as one of the synthetic resins. The potting material in turn is protected by suitable cap members 89 and 91. In the case of the mobile end cap assembly, the protective cap is soldered or otherwise secured to the plate 31, and in the case of the fixed end cap assembly, the protective cap is soldered or otherwise secured to the central bushing member 17.

I claim:
1. A fluid-cooled vacuum variable capacitor comprising, a tubular dielectric envelope portion,
a fixed end cap assembly closing one end of the dielectric envelope portion,
a set of fixed capacitor plates supported on said fixed end cap assembly,
a mobile end cap assembly closing the other end of the dielectric envelope portion,
a set of mobile capacitor plates supported on said mobile end cap assembly and movable relative to said set of fixed capacitor plates, and
means in said mobile end cap assembly including an inlet port and an outlet port and forming a passageway therethrough for the circulation of a coolant fluid.

2. A fluid-cooled vacuum variable capacitor comprising, a tubular dielectric envelope portion,
a fixed end cap assembly closing one end of the dielectric envelope portion,
a set of fixed capacitor plates supported on said fixed end cap assembly,
a mobile end cap assembly closing the other end of the dielectric envelope portion,
a set of mobile capacitor plates supported on said mobile end cap assembly and movable relative to said set of fixed capacitor plates, and
means in said fixed end cap assembly including an inlet and an outlet port and forming a passageway therethrough for the circulation of a coolant fluid.

3. A fluid-cooled vacuum variable capacitor comprising, a tubular dielectric envelope portion,
a fixed end cap assembly closing one end of the dielectric envelope portion,
a set of fixed capacitor plates supported on said fixed end cap assembly,
a mobile end cap assembly closing the other end of the dielectric envelope portion,
a set of mobile capacitor plates supported on said mobile end cap assembly and movable relative to said set of fixed capacitor plates, and
means in said mobile and fixed end cap assemblies including inlet and outlet ports in each and forming a passageway through each thereof for the circulation of a coolant fluid.

4. The combination according to claim 1, in which said mobile end cap assembly comprises a subassembly including an annular base plate having an integral cylindrical flange about its outer periphery, a cylindrical section constituting an extension of said flange and hermetically united thereto at one end, and a sealing ring united to the other end of said cylindrical extension and including a radially outwardly extending seal flange hermetically bonded to said dielectric envelope portion and a cylindrical corona shield portion extending into the dielectric envelope portion and effective to shield the adjacent bond of said sealing ring to said dielectric envelope portion against corona discharges.

5. The combination according to claim 1, in which said mobile end cap assembly includes a sealing ring portion including a radially outwardly extending seal flange hermetically bonded to the dielectric envelope portion and a cylindrical corona shield portion extending into the dielectric envelope portion and effective to shield the adjacent bond of said sealing ring to the dielectric envelope portion against stresses imposed by high-potential differences existing between the electrodes.

6. The combination according to claim 1, in which said mobile end cap assembly comprises a generally cylindrical cup-shaped member having a bottom including a central aperture and side walls and an expansible metallic bellows hermetically sealing said aperture, and said means forming a passageway through said mobile end cap assembly includes a plurality of axially spaced flat baffles extending transversely across said cup-shaped member in substantial parallelism with the bottom thereof to form passageways therebetween and a plurality of tubular radially spaced baffles supported on said cup-shaped member and forming passageways therebetween, the passageways formed by said flat and tubular baffles being serially interposed between said inlet and outlet ports.

7. The combination according to claim 2, in which said fixed end cap assembly comprises a cup-shaped member opening into said envelope and having a bottom including a central aperture and side walls, a support plate for supporting said set of fixed capacitor plates and extending transversely across said cup-shaped member spaced from said bottom and having its outer periphery hermetically united to said side walls, a tubulation hermetically sealing the aperture in said bottom and dividing the space between said bottom and said support plate into an annular chamber, and a plurality of baffles in said chamber forming a tortuous passageway serially interposed between said inlet and outlet ports.

8. A vacuum variable capacitor comprising,
a tubular dielectric envelope portion,
a fixed end cap assembly closing one end of the dielectric envelope portion,
a set of fixed capacitor plates supported on said fixed end cap assembly,
a mobile end cap assembly closing the other end of the dielectric envelope portion,
a set of mobile capacitor plates supported on said mobile end cap assembly and movable relative to said set of fixed capacitor plates, and
a sealing ring hermetically interposed between said mobile end cap assembly and said dielectric envelope portion and including a radially outwardly extending seal flange hermetically bonded to said dielectric envelope portion and a cylindrical corona shield portion extending into the dielectric envelope portion and effective to shield the adjacent bond of said sealing ring to said dielectric envelope portion against stresses imposed by high-potential differences existing between the electrodes.

9. The combination according to claim 6, in which said plurality of tubular radially spaced baffles includes one surface of said expansible metallic bellows, a pair of concentrically arranged tubular shells disposed about said bellows and movable axially relative to each other, and a second bellows surrounding said tubular shells.

10. In an envelope for high voltage electronic components, which envelope includes adjacent dielectric and metallic portions united to form a vacuum tight seal, the combination comprising a metallic sealing ring having a radially extending annular seal flange bonded adjacent its outer periphery to the dielectric portion of the envelope and adjacent its inner periphery bonded to said metallic envelope portion, and a corona shield portion secured to the inner periphery of the seal flange to shield the union of said seal flange with the dielectric portion against corona discharges.

11. The seal structure according to claim 10, in which said corona shield portion includes a cylindrical portion extending into the dielectric portion substantially parallel thereto, the end of said cylindrical portion remote from the seal flange being rolled.

12. In a vacuum capacitor, a metallic cup-shaped end cap assembly comprising one end of a vacuum tight envelope and including a bottom and a cylindrical side wall, the end of said side wall terminating in a radially outwardly extending seal flange, said seal flange and a portion of said cylindrical side wall immediately adjacent said seal flange being reduced in thickness, a metallic plate within the cup shaped end cap extending transversely thereacross and spaced from said bottom and having its outer periphery brazed to said cylindrical side wall at a point spaced from said radially outwardly extending seal flange.

13. The combination according to claim 12, in which the outer periphery of said transversely extending plate is brazed to said reduced in thickness portion of the cylindrical side wall.

References Cited by the Examiner
UNITED STATES PATENTS 2,492,747  12/1949  Herr et al. _____ 317—243 X
3,040,220  6/1962  Neibaur _____ 317—245

FOREIGN PATENTS 361,863  6/1962  Switzerland.

LARAMIE E. ASKIN, *Primary Examiner.*

E. GOLDBERG, *Assistant Examiner.*